(12) United States Patent  
Smith et al.

(10) Patent No.: US 7,581,231 B2  
(45) Date of Patent: Aug. 25, 2009

(54) COMPUTING SYSTEM AND METHOD FOR ALLOWING PLURALITY OF APPLICATIONS WRITTEN IN DIFFERENT PROGRAMMING LANGUAGES TO COMMUNICATE AND REQUEST RESOURCES OR SERVICES VIA A COMMON LANGUAGE RUNTIME LAYER

(75) Inventors: Adam W. Smith, Redmond, WA (US); Anthony J. Moore, Seattle, WA (US); Anders Hejlsberg, Seattle, WA (US); Brian A. LaMacchia, Bellevue, WA (US); Blaine J. Dockter, Bellevue, WA (US); Brian M. Grunkemeyer, Issaquah, WA (US); Brian K. Pepin, (Continued)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 10/087,027

(22) Filed: Feb. 28, 2002  
(Under 37 CFR 1.47)

(65) Prior Publication Data

US 2003/0028685 A1    Feb. 6, 2003

Related U.S. Application Data

(63) Continuation of application No. 09/902,936, filed on Jul. 10, 2001, now abandoned.

(51) Int. Cl.  
*G06F 13/00* (2006.01)  
*G06F 15/16* (2006.01)  
*G06F 17/00* (2006.01)  
*G06F 3/00* (2006.01)

(52) U.S. Cl. .................. 719/328; 709/203; 715/234; 715/740

(58) Field of Classification Search .......... 709/201–219; 719/328, 311; 715/501.1, 513, 738, 760, 715/740–753, 205, 234; 717/114–121  
See application file for complete search history.

(56) References Cited

U.S. PATENT DOCUMENTS 5,218,699 A    6/1993  Brandle et al.  
5,430,876 A    7/1995  Schreiber et al.

(Continued)

OTHER PUBLICATIONS

Hanson, "Differences between J2SE and J2EE", Sep. 8, 2003, SearchTechTarget.com.

(Continued)

*Primary Examiner*—Li B Zhen  
*Assistant Examiner*—Charles E Anya  
(74) *Attorney, Agent, or Firm*—Lee & Hayes, PLLC

(57) ABSTRACT

An application program interface (API) provides a set of functions for application developers who build Web applications on Microsoft Corporation's .NET™ platform.

12 Claims, 4 Drawing Sheets

(75) Inventors: Seattle, WA (US); Caleb L. Doise, Bellevue, WA (US); Christopher W. Brumme, Mercer Island, WA (US); Chad W. Royal, Redmond, WA (US); Christopher L. Anderson, Issaquah, WA (US); Corina E. Feuerstein, Redmond, WA (US); Craig T. Sinclair, Sammamish, WA (US); Daniel Dedu-Constantin, Redmond, WA (US); Daniel Takacs, Bellevue, WA (US); David S. Ebbo, Redmond, WA (US); David S. Mortenson, Redmond, WA (US); Erik B. Christensen, Seattle, WA (US); Erik B. Olson, Sammamish, WA (US); Fabio A. Yeon, Mill Creek, WA (US); Giovanni M. Della-Libera, Seattle, WA (US); Gopala Krishna R. Kakivaya, Sammamish, WA (US); Gregory D. Fee, Seattle, WA (US); Hany E. Ramadan, Kirkland, WA (US); Jayanth V. Rajan, Bellevue, WA (US); Jeffrey M. Cooperstein, Bellevue, WA (US); Jonathan C. Hawkins, Seattle, WA (US); James H. Hogg, Bellevue, WA (US); Joe D. Long, Woodinville, WA (US); John I. McConnell, Kirkland, WA (US); Jesus Ruiz-Scougall, Redmond, WA (US); James S. Miller, Bellevue, WA (US); Julie D. Bennett, Medina, WA (US); Jun Fang, Sammamish, WA (US); Krzysztof J. Cwalina, Redmond, WA (US); Keith W. Ballinger, North Bend, WA (US); Lance E. Olson, Sammamish, WA (US); Loren M. Kohnfelder, Bellevue, WA (US); Luca Bolognese, Redmond, WA (US); Manu Vasandani, Bellevue, WA (US); Mark T. Anders, Bellevue, WA (US); Mark P. Ashton, Kent, WA (US); Mark A. Boulter, Remond, WA (US); Mark W. Fussell, Sammamish, WA (US); Michael M. Magruder, Sammamish, WA (US); Manish S. Prabhu, Redmond, WA (US); Neetu Rajpal, Redmond, WA (US); Nikhil Kothari, Sammamish, WA (US); Nithyalakshmi Sampathkumar, Bellevue, WA (US); Nicholas M. Kramer, Redmond, WA (US); Omri Gazitt, Redmond, WA (US); Radu Rares Palanca, Redmond, WA (US); Raja Krishnaswamy, Bellevue, WA (US); Robert M. Howard, Snoqualmie, WA (US); Ramasamy Krishnaswamy, Redmond, WA (US); Shawn P. Burke, Kirkland, WA (US); Scott D. Guthrie, Bellevue, WA (US); Sean E. Trowbridge, Sammamish, WA (US); Seth M. Demsey, Kirkland, WA (US); Shajan Dasan, Sammamish, WA (US); Subhag P. Oak, Redmond, WA (US); Sreeram Nivarthi, Sammamish, WA (US); Stefan H. Pharies, Seattle, WA (US); Suzanne M. Cook, Redmond, WA (US); Susan M. Warren, Carnation, WA (US); Tarun Anand, New Dehli (IN); Travis J. Muhlestein, Redmond, WA (US); William A. Adams, Bellevue, WA (US); Yan Leshinsky, Bellevue, WA (US); Yann E. Christensen, Seattle, WA (US); Yung-shin Lin, Sammamish, WA (US); Stephen J. Millet, Edmonds, WA (US); Joseph Roxe, Kirkland, WA (US); Alan Boshier, Redmond, WA (US); Henry L. Sanders, Kirkland, WA (US); David Bau, Gladwyne, PA (US)

U.S. PATENT DOCUMENTS

| | | |
|---|---|---|
| 5,689,700 A | 11/1997 | Miller et al. |
| 5,748,962 A | 5/1998 | Brechtel et al. |
| 5,761,494 A | 6/1998 | Smedley et al. |
| 5,822,580 A | 10/1998 | Leung |
| 5,903,753 A | 5/1999 | Bramnick et al. |
| 5,937,406 A | 8/1999 | Balabine et al. |
| 5,943,424 A | 8/1999 | Berger et al. |
| 5,956,509 A | 9/1999 | Kevner |
| 5,987,517 A * | 11/1999 | Firth et al. .................. 709/230 |
| 6,061,743 A | 5/2000 | Thatcher et al. |
| 6,175,878 B1 | 1/2001 | Seaman et al. |
| 6,209,124 B1 | 3/2001 | Vermeire et al. |
| 6,256,678 B1 | 7/2001 | Traughber et al. |
| 6,275,871 B1 | 8/2001 | Reinfelder et al. |
| 6,282,581 B1 | 8/2001 | Moore et al. |
| 6,298,354 B1 | 10/2001 | Saulpaugh et al. |
| 6,349,343 B1 | 2/2002 | Foody et al. |
| 6,353,830 B1 | 3/2002 | Yee et al. |
| 6,360,230 B1 | 3/2002 | Chan et al. |
| 6,360,266 B1 | 3/2002 | Pettus |
| 6,381,632 B1 | 4/2002 | Lowell |
| 6,418,448 B1 | 7/2002 | Sarkar |
| 6,430,593 B1 | 8/2002 | Lindsley |
| 6,442,548 B1 | 8/2002 | Balabine et al. |
| 6,446,253 B1 | 9/2002 | Mellmer |
| 6,446,256 B1 | 9/2002 | Hyman et al. |
| 6,473,794 B1 | 10/2002 | Guheen et al. |
| 6,480,865 B1 | 11/2002 | Lee et al. |
| 6,487,578 B2 | 11/2002 | Ranganathan |
| 6,507,856 B1 | 1/2003 | Chen et al. |
| 6,519,571 B1 | 2/2003 | Guheen et al. |
| 6,536,037 B1 | 3/2003 | Guheen et al. |
| 6,598,093 B1 | 7/2003 | Schmidt et al. |
| 6,609,158 B1 * | 8/2003 | Nevarez et al. ............. 719/316 |
| 6,615,166 B1 | 9/2003 | Guheen et al. |
| 6,643,652 B2 | 11/2003 | Helgeson et al. |
| 6,721,713 B1 | 4/2004 | Guheen et al. |
| 6,792,605 B1 * | 9/2004 | Roberts et al. ............. 719/313 |
| 6,938,079 B1 | 8/2005 | Anderson et al. |
| 6,961,750 B1 | 11/2005 | Burd et al. |
| 6,968,503 B1 | 11/2005 | Chang et al. |
| 7,013,340 B1 | 3/2006 | Burd et al. |
| 2002/0073236 A1 | 6/2002 | Helgeson |
| 2002/0092004 A1 | 7/2002 | Lee et al. |
| 2002/0099687 A1 | 7/2002 | Krishnaprasad et al. |
| 2002/0112078 A1* | 8/2002 | Yach .......................... 709/246 |
| 2002/0152244 A1 | 10/2002 | Dean et al. |
| 2002/0169679 A1 | 11/2002 | Neumayer |
| 2002/0184401 A1 | 12/2002 | Kadel, Jr. et al. |
| 2003/0005048 A1* | 1/2003 | Risalvato ..................... 709/203 |
| 2003/0028685 A1 | 2/2003 | Smith et al. |
| 2003/0051236 A1 | 3/2003 | Pace et al. |
| 2003/0074206 A1 | 4/2003 | Hoffman et al. |
| 2003/0084120 A1 | 5/2003 | Egli |
| 2003/0120665 A1 | 6/2003 | Fox et al. |
| 2003/0149934 A1 | 8/2003 | Worden |
| 2003/0167277 A1 | 9/2003 | Hejlsberg et al. |
| 2003/0167355 A1 | 9/2003 | Smith et al. |
| 2003/0167356 A1 | 9/2003 | Smith et al. |

| | | | |
|---|---|---|---|
| 2003/0172196 | A1 | 9/2003 | Hejlsberg et al. |
| 2003/0177282 | A1 | 9/2003 | Hejlsberg et al. |
| 2004/0083463 | A1 | 4/2004 | Hawley |
| 2004/0117759 | A1 | 6/2004 | Rippert, Jr. |
| 2004/0205694 | A1 | 10/2004 | James et al. |
| 2006/0294500 | A1* | 12/2006 | Chiang ...................... 717/109 |

OTHER PUBLICATIONS

Arulanthu, et al, "The Design and Performanceof A Scalable ORB Architecture for CORBA Asynchronous Messaging." Middleware 2000, Springer-Verlag, 2000, pp. 208-228.

Deitel & Deitel "Java(TM) How to Program Book" Prentice Hall Third Edition 1999 (pp. 7-29, 214-226, 698-699, 714-717, 817-838, 876-878, 936-977, 980-998, 1002-1046).

U.S. Appl. No. 09/901,555, filed Jul. 10, 2001 entitled "Application Program Interface for Network Software Platform."

Deitel & Deitel, Java™ How to Program book, Prentice Hall, Third edition, 1999 (pp. 7-29, 698-699, 714-717, 876-878, 936-977, 980-998, 1002-1046).

Tim O'Reilly, "The Network Really Is the Computer," Jun. 8, 2000, pp. 1-11, The O'Reilly Network, <http://www.oreillynet.com>, retrieved from the Internet on Apr. 7, 2003.

The Java™ 2 Enterprise Edition Developer's Guide, v1.2.1, May 2000, Sun Microsystems, Palo Alto Ca. U.S.A.; Chpt. 1, pp. 1-10; and Chpt. 9, pp. 152-155.

Bill Shannon, Java™ 2 Platform Enterprise Edition Specification, v1.2, Sun Microsystems, Palo Alto, Ca. U.S.A., Dec. 17, 1999, Chpt. 2, pp. 1-7; and Chpt. 6, p. 1.

Java™ Platform, Standard Edition, v1.2.2 API Specification, 1993-1999 Sun Microsystems, Inc., pp. 1-4, <http://java.sun.com/products/jdk/1.2/docs/api/overview-summary.html>, retrieved from the Internet on Apr. 4, 2003.

Lam et al.; .NET Framework Essentials Jun. 2001 O'Reilly pp. 1-32.

Meyer; [Microsoft; NET is coming [Microsoft Web Services platform] IEEE Computer vol. 34 Issue: Aug. 8, 2001 pp. 92-97.

Cheng et al.; "XML and DB2" IEEE Data Engineering 2000. Proceedings 16th International Conference on Feb. 29-Mar. 3, 2000 pp. 569-573.

Shannon; "Java 2 Platrform Enterpise Edition Specification" v1.2 Dec. 17, 1999 pp. 2-8 thru 2-11 and 6-2 thru 6-6.

Flanagan; "Java in a Nutshell" O'Reilly & Associates 1996 pp. 193-200, 237-253 267-270.339-342.

Flanagan; "Java foundation classes in a Nutshell" O'Reilly 9-1000 Chapters 1-2.

Gould; "Develop n-tier applications using J2EE" Java World Dec. 2000 pp. 1-10.

Deitel & Deitel; Java™ How to Program book, Prentice Hall, Third edition, 1999 (pp. 214-226, 817-838).

H Carr et al., Compiling Distributed C++, IEEE, 1993, pp. 496-503.

http:///www.w3.org/TR/xstl,W3C Nov. 1999, pp. 1-90.

http://www.w3.org/TR/1998/NOTE-XML-data-0105,W3C, Jan. 1998, pp. 1-34.

http://www.w3.org/TR/1999/REC-xpath-19991116.html,WC3,Nov. 1999, pp. 1-32.

Ben, A comparative Overview of C#, Genamics, Jul. 31, 2000.

Cohn, Web programming with Visual J++, Sams.net, 1997, chapters 5-6, 17-19.

Flynn, Visual J++ Java programming, New Riders Publishing, 1996, pp. 133-143.

Microsoft, Delegates In Visual J++ 6.0, Mar. 11, 1998, pp. 1-6.

Farley, "Microsoft .Net vs. J2EE: How Do They Stack Up?", retrieved on Apr. 27, 2007, at <<http://www.oreillynet.com/1pt/a/1799>>, O'Reilly Media, Inc., 2007, pp. 6.

Perry, "Sams Teach Yourself Visual Basic 6 in 21 Days", Sams, 1998, pp. 23.

Wille, "Presenting C#", Sams Publishing, 2000, pp. 22.

Ensel, et al., "Managing Application Service Dependencies with XML and the Resource Description Framework", IEEE, May 2001, pp. 661-674.

Hou, et al., "Object-Oriented Representation for XML Data", IEEE, Apr. 2001, pp. 40-49.

Sneed, "Wrapping Legacy COBOL Programs behind an XML-Interface", IEEE Oct. 2001, pp. 189-197.

"Java 2 Platform, Standard Edition", retrieved on Apr. 4, 2003 at <<http://java.sum.com/products/jdk/1.2/docs/api/overview-summary.html>>, Sun Microsystems, v.1.2.2., 1993-1999, p. 1-4.

Williams, "Teach Yourself Visual C++ 6 in 24 Hours", Sams Publishing, Aug. 13, 1998, pp. 54.

Wille, "Presenting C#", Sams Publishing, 2002, pp. 21-29, 164-167.

* cited by examiner

COMPUTING SYSTEM AND METHOD FOR ALLOWING PLURALITY OF APPLICATIONS WRITTEN IN DIFFERENT PROGRAMMING LANGUAGES TO COMMUNICATE AND REQUEST RESOURCES OR SERVICES VIA A COMMON LANGUAGE RUNTIME LAYER

RELATED APPLICATIONS

This application is a continuation of application Ser. No. 09/902,936 entitled "Application Program Interface for Network Software Platform", filed Jul. 10, 2001 (now abandoned).

This relates to the following six patents, all of which are incorporated herein by reference:

U.S. Pat. No. 7,017,162, entitled "Application Program Interface for Network Software Platform", which issued Mar. 21, 2006, from application Ser. No. 09/902,811, filed Jul. 10, 2001.

U.S. Pat. No. 7,117,504, entitled "Application Program Interface for Network Software Platform", which issued Oct. 3, 2006, from application Ser. No. 09/902,809, filed Jul. 10, 2001.

U.S. Pat. No. 6,920,461, entitled "Application Program Interface for Network Software Platform", which issued Jul. 19, 2005, from application Ser. No. 09/902,560, filed Jul. 10, 2001.

U.S. Pat. No. 7,165,239, entitled "Application Program Interface for Network Software Platform", which issued Jan. 16, 2007, from application Ser. No. 09/902,810, filed Jul. 10, 2001.

Application Ser. No. 09/902,812, filed Jul. 10, 2001, entitled Application Program Interface for Network Software Platform.

Application Ser. No. 09/901,555 (Now Abandoned), filed Jul. 10, 2001, entitled Application Program Interface for Network Software Platform.

TECHNICAL FIELD

This invention relates to network software, such as Web applications, and to computer software development of such network software. More particularly, this invention relates to an application program interface (API) that facilitates use of a network software platform by application programs and computer hardware.

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as Microsoft Windows®, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation is developing a network software platform known as the ".NET" platform (read as "Dot Net"). The platform allows developers to create Web services that will execute over the Internet. Such a dynamic shift requires a new ground-up design of an entirely new API.

In response to this challenge, the inventors developed a unique set of API functions for Microsoft's .NET™ platform.

SUMMARY

An application program interface (API) provides a set of functions for application developers who build Web applications on a network platform, such as Microsoft Corporation's .NET™ platform.

BRIEF DESCRIPTION OF THE DRAWINGS

The same numbers are used throughout the drawings to reference like features.

BRIEF DESCRIPTION OF ACCOMPANYING COMPACT DISC

Figure 1:
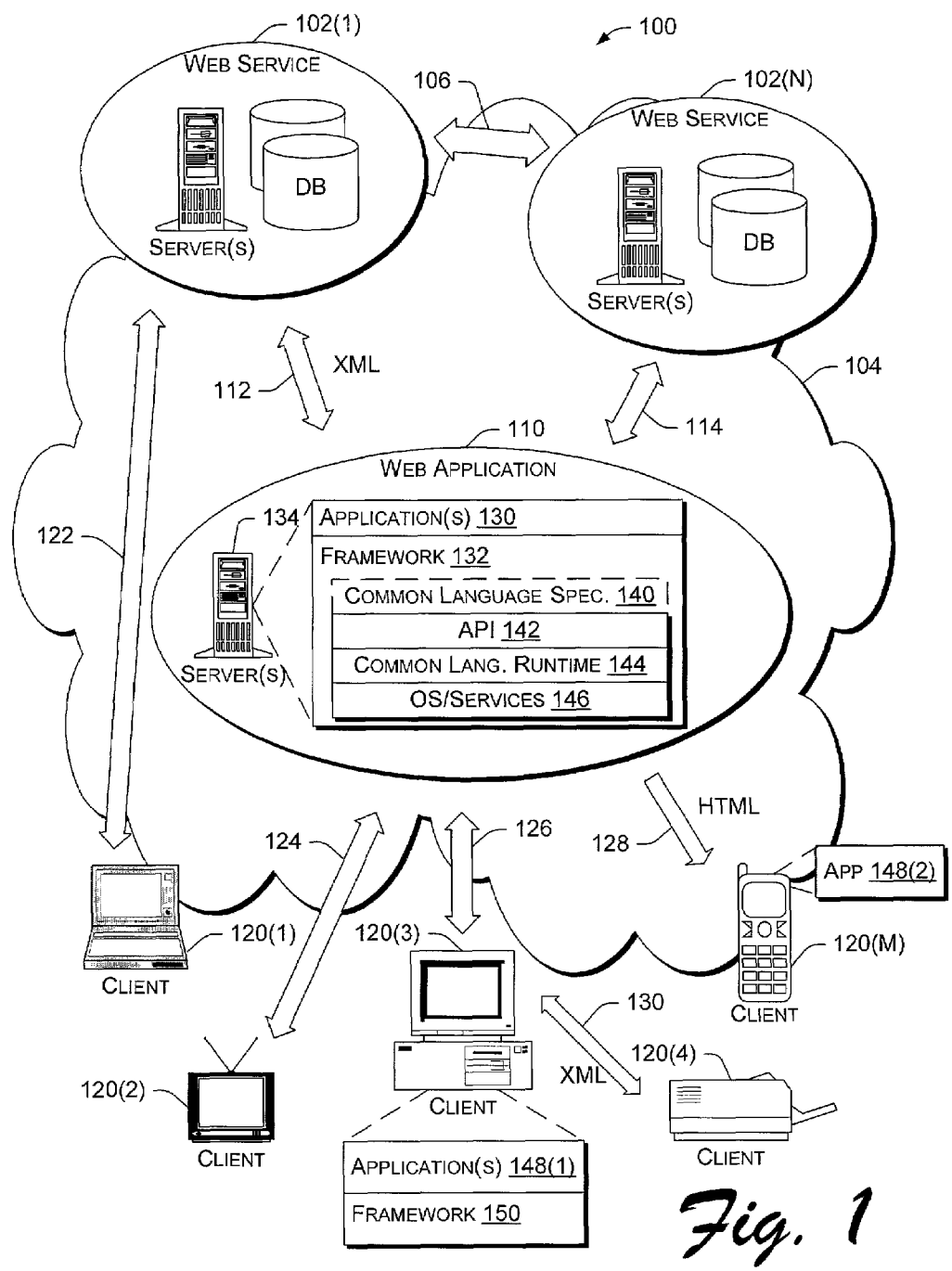
FIG. 1 illustrates a network architecture in which clients access Web services over the Internet using conventional protocols.

Accompanying this specification is a duplicative set of compact discs, identified as "Copy 1" and "Copy 2". Each disc stores a compiled HTML help file identifying the API (application program interface) for Microsoft's .NET™ network platform. The file is named "cpref.chm" and was created on Jun. 8, 2001. It is 30.81 Mbytes in size. The file can be executed on a Windows®-based computing device (e.g., IBM-PC, or equivalent) that executes a Windows®-brand operating system (e.g., Windows® NT, Windows® 98, Windows® 2000, etc.). The compiled HTML help file stored on the compact disc is hereby incorporated by reference. The compact disc itself is a CD-ROM, and conforms to the ISO 9660 standard.

Additionally, each compact disc stores 94 separate text files named "NamespaceName.txt" which contain the APIs listed in the compiled HTML help file. The text files comply with the ASCII format and may be read using a Windows®-based computing device (e.g., IBM-PC, or equivalent) that executes a Windows®-brand operating system (e.g., Windows® NT, Windows® 98, Windows® 2000, etc.). The text files stored on the compact disc are hereby incorporated by reference.

| File | Size | Date |
|---|---:|---|
| System.Windows.Forms.txt | 2,463,923 | Jul. 6, 2001 |
| System.CodeDom.Compiler.txt | 163,205 | Jul. 6, 2001 |
| System.ComponentModel.Design.txt | 229,762 | Jul. 6, 2001 |
| System.Configuration.Assemblies.txt | 6,457 | Jul. 6, 2001 |
| System.ComponentModel.txt | 534,420 | Jul. 6, 2001 |
| System.ComponentModel.Design.Serialization.txt | 56,951 | Jul. 6, 2001 |
| System.Configuration.txt | 24,160 | Jul. 6, 2001 |
| System.txt | 1,372,604 | Jul. 6, 2001 |
| System.Net.txt | 284,291 | Jul. 6, 2001 |
| System.Collections.txt | 177,639 | Jul. 6, 2001 |
| System.Globalization.txt | 331,753 | Jul. 6, 2001 |
| System.Net.Sockets.txt | 137,612 | Jul. 6, 2001 |
| System.Collections.Specialized.txt | 99,154 | Jul. 6, 2001 |
| System.Xml.Schema.txt | 122,405 | Jul. 6, 2001 |
| System.Xml.Serialization.txt | 224,452 | Jul. 6, 2001 |
| System.Xml.XPath.txt | 56,553 | Jul. 6, 2001 |
| System.Xml.txt | 416,578 | Jul. 6, 2001 |
| System.Xml.Xsl.txt | 3,552 | Jul. 6, 2001 |
| System.Data.Common.txt | 114,227 | Jul. 7, 2001 |
| System.Data.OleDb.txt | 155,509 | Jul. 7, 2001 |
| System.Data.SqlClient.txt | 121,455 | Jul. 7, 2001 |
| System.Data.SqlTypes.txt | 352,862 | Jul. 7, 2001 |
| System.Diagnostics.txt | 399,479 | Jul. 7, 2001 |
| System.DirectoryServices.txt | 98,856 | Jul. 7, 2001 |
| System.Drawing.Design.txt | 89,887 | Jul. 7, 2001 |
| System.Drawing.Drawing2D.txt | 212,421 | Jul. 7, 2001 |
| System.Reflection.txt | 298,065 | Jul. 7, 2001 |
| System.Drawing.txt | 702,023 | Jul. 7, 2001 |
| System.Drawing.Imaging.txt | 232,591 | Jul. 7, 2001 |
| System.Drawing.Printing.txt | 142,134 | Jul. 7, 2001 |
| System.Drawing.Text.txt | 8,501 | Jul. 7, 2001 |
| System.EnterpriseServices.txt | 138,609 | Jul. 8, 2001 |
| System.IO.txt | 308,389 | Jul. 7, 2001 |
| System.Resources.txt | 70,121 | Jul. 7, 2001 |
| System.IO.IsolatedStorage.txt | 56,779 | Jul. 7, 2001 |
| System.Messaging.txt | 342,690 | Jul. 7, 2001 |
| System.Reflection.Emit.txt | 352,613 | Jul. 7, 2001 |
| System.Runtime.CompilerServices.txt | 20,020 | Jul. 7, 2001 |
| System.Runtime.InteropServices.Expando.txt | 1,497 | Jul. 7, 2001 |
| System.Runtime.InteropServices.txt | 389,509 | Jul. 7, 2001 |
| System.Runtime.Remoting.Activation.txt | 12,595 | Jul. 7, 2001 |
| System.Runtime.Remoting.Channels.txt | 116,351 | Jul. 7, 2001 |
| System.Runtime.Remoting.Channels.Http.txt | 36,192 | Jul. 7, 2001 |
| System.Runtime.Remoting.Channels.Tcp.txt | 24,032 | Jul. 7, 2001 |
| System.Runtime.Remoting.Contexts.txt | 43,554 | Jul. 7, 2001 |
| System.Runtime.Remoting.txt | 112,724 | Jul. 7, 2001 |
| System.Runtime.Remoting.Lifetime.txt | 14,216 | Jul. 7, 2001 |
| System.Runtime.Remoting.Messaging.txt | 69,733 | Jul. 7, 2001 |
| System.Runtime.Remoting.Metadata.txt | 10,824 | Jul. 7, 2001 |
| System.Runtime.Remoting.Metadata.W3cXsd2001.txt | 58,782 | Jul. 7, 2001 |
| System.Runtime.Remoting.MetadataServices.txt | 15,165 | Jul. 7, 2001 |
| System.Runtime.Remoting.Proxies.txt | 12,034 | Jul. 7, 2001 |
| System.Runtime.Remoting.Services.txt | 13,600 | Jul. 7, 2001 |
| System.Runtime.Serialization.Formatters.Binary.txt | 9,694 | Jul. 7, 2001 |
| System.Runtime.Serialization.Formatters.txt | 16,288 | Jul. 7, 2001 |
| System.Runtime.Serialization.txt | 122,559 | Jul. 7, 2001 |
| System.Runtime.Serialization.Formatters.Soap.txt | 9,712 | Jul. 7, 2001 |
| System.Security.Cryptography.txt | 250,786 | Jul. 7, 2001 |
| System.Security.Cryptography.X509Certificates.txt | 26,564 | Jul. 7, 2001 |
| System.Configuration.Install.txt | 57,485 | Jul. 8, 2001 |
| System.Security.Permissions.txt | 206,364 | Jul. 7, 2001 |
| System.Security.txt | 83,229 | Jul. 7, 2001 |
| System.Security.Policy.txt | 162,414 | Jul. 7, 2001 |
| System.Text.txt | 130,394 | Jul. 7, 2001 |
| System.Security.Principal.txt | 27,479 | Jul. 7, 2001 |
| System.ServiceProcess.txt | 77,072 | Jul. 7, 2001 |
| System.Text.RegularExpressions.txt | 76,478 | Jul. 7, 2001 |
| System.Threading.txt | 111,902 | Jul. 7, 2001 |
| System.Timers.txt | 10,381 | Jul. 7, 2001 |
| System.Windows.Forms.Design.txt | 168,099 | Jul. 7, 2001 |
| System.Web.txt | 237,045 | Jul. 9, 2001 |
| System.Diagnostics.SymbolStore.txt | 51,472 | Jul. 8, 2001 |
| System.Management.txt | 255,522 | Jul. 8, 2001 |
| System.Management.Instrumentation.txt | 14,199 | Jul. 8, 2001 |
| System.Web.Caching.txt | 26,389 | Jul. 9, 2001 |
| System.Web.Configuration.txt | 7,820 | Jul. 9, 2001 |
| System.Web.Hosting.txt | 13,234 | Jul. 9, 2001 |
| System.Web.Mail.txt | 11,187 | Jul. 9, 2001 |
| System.Web.Security.txt | 77,598 | Jul. 9, 2001 |
| System.Web.Services.txt | 20,955 | Jul. 9, 2001 |
| System.Web.Services.Configuration.txt | 8,242 | Jul. 9, 2001 |
| System.Web.Services.Description.txt | 215,516 | Jul. 9, 2001 |
| System.Web.Services.Discovery.txt | 80,061 | Jul. 9, 2001 |
| System.Web.Services.Protocols.txt | 171,896 | Jul. 9, 2001 |
| System.Web.SessionState.txt | 5,064 | Jul. 9, 2001 |
| System.Web.UI.txt | 254,142 | Jul. 9, 2001 |
| System.Web.UI.Design.txt | 120,182 | Jul. 9, 2001 |
| System.Web.UI.Design.WebControls.txt | 77,222 | Jul. 9, 2001 |

-continued

| | | |
|---|---|---|
| System.Web.UI.HtmlControls.txt | 62,508 | Jul. 9, 2001 |
| System.Web.UI.WebControls.txt | 607,903 | Jul. 9, 2001 |
| System.CodeDom.txt | 233,760 | Jul. 9, 2001 |
| System.Data.txt | 440,804 | Jul. 9, 2001 |
| System.EnterpriseServices.Compensating ResourceManager.txt | 24,077 | Jul. 9, 2001 |
| System.Security.Cryptography.Xml.txt | 86,585 | Jul. 9, 2001 |

Also, each compact disc stores a file entitled "Common Language Runtime Specification" that contains the following Word® documents, their sizes, and date of creation:

| | | |
|---|---|---|
| Document Format Information | 1 KB | Jul. 9, 2001 |
| Glossary | 80 KB | May 17, 2001 |
| Partition I Architecture | 3,350 KB | May 17, 2001 |
| Partition II Metadata | 10,494 KB | May 17, 2001 |
| Partition III CIL | 1,107 KB | May 17, 2001 |
| Partition IV Library | 1,332 KB | May 17, 2001 |
| Partition V Annexes | 1,036 KB | May 17, 2001 |
| WDO5-Review | 4,690 KB | May 17, 2001 |

The Common Language Runtime Specification (inclusive of all documents above) is incorporated by reference.

DETAILED DESCRIPTION

This disclosure addresses an application program interface (API) for a network platform upon which developers can build Web applications and services. More particularly, an exemplary API is described for the .NET™ platform created by Microsoft Corporation. The .NET™ platform is a software platform for Web services and Web applications implemented in the distributed computing environment. It represents the next generation of Internet computing, using open communication standards to communicate among loosely coupled Web services that are collaborating to perform a particular task.

In the described implementation, the .NET™ platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the .NET™ platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

FIG. 1 shows a network environment 100 in which a network platform, such as the .NET™ platform, may be implemented. The network environment 100 includes representative Web services 102(1), ..., 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), ..., 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
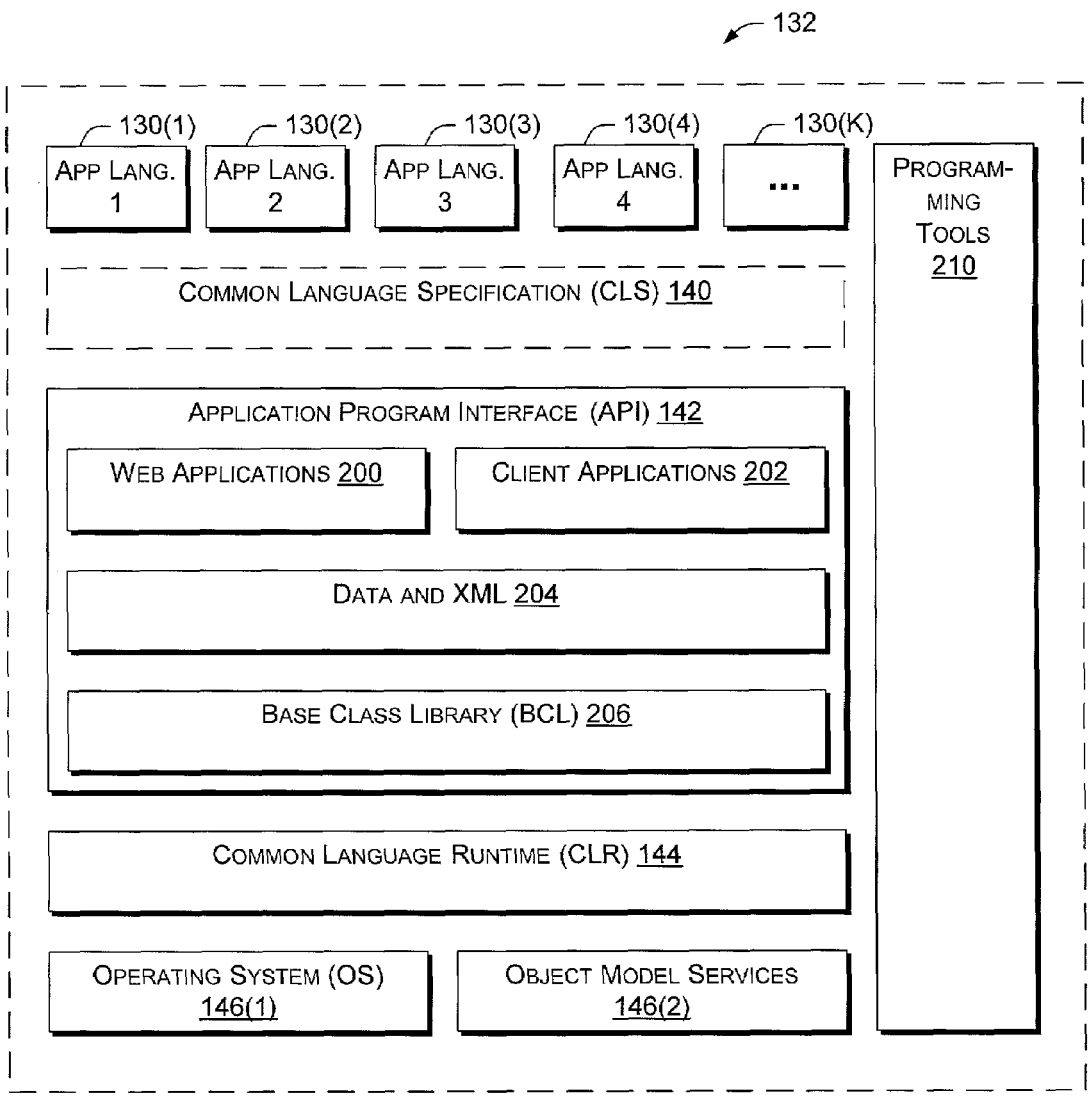
FIG. 2 is a block diagram of a software architecture for Microsoft's .NTM™ platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105, now U.S. Pat. No. 6,836,883 issued Dec. 28, 2004) and "Unified Data Type System and Method" filed Jul. 10, 2000 (Ser. No. 09/613,289, now abandoned), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCLs). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2D), imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Root API Namespaces

Figure 3:
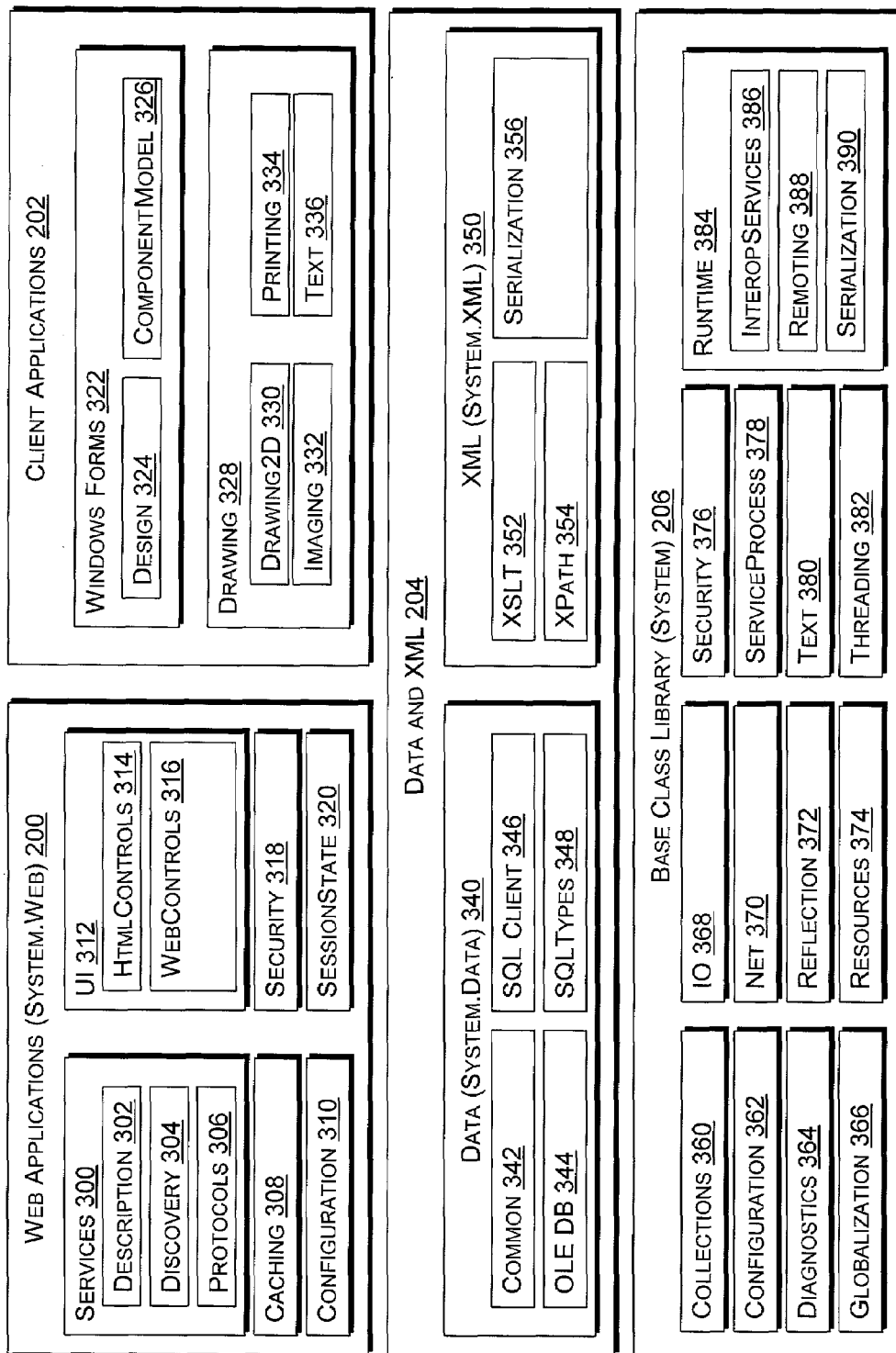
FIG. 3 is a block diagram of unique namespaces supported by the APT, as well as function classes of the various API functions.

FIG. 3 shows the API 142 and its four root namespaces in more detail. In one embodiment, the namespaces are identified according to a hierarchical naming convention in which strings of names are concatenated with periods. For instance, the Web applications namespace 200 is identified by the root name "System.Web". Within the "Sytem.Web" namespace is another namespace for Web services, identified as "System.Web.Services", which further identifies another namespace for a description known as "System.Web.Services.Description". With this naming convention in mind, the ii following provides a general overview of selected namespaces of the API 142, although other naming conventions could be used with equal effect.

The Web applications namespace 200 ("System.Web") defines additional namespaces, including:

A services namespace 300 ("System.Web.Services") containing classes that enable a developer to build and use Web services. The services namespace 300 defines additional namespaces, including a description namespace 302 ("System.Web.Services.Description") containing classes that enable a developer to publicly describe a Web service via a service description language (such as WSDL, a specification available from the W3C), a discovery namespace 304 ("System.Web.Services.Discovery") containing classes that allow Web service consumers to locate available Web Services on a Web server, and a protocols namespace 306 ("System.Web.Services.Protocols") containing classes that define the protocols used to transmit data across a network during communication between Web service clients and the Web service itself.

A caching namespace 308 ("System.Web.Caching") containing classes that enable developers to decrease Web application response time through temporarily caching frequently used resources on the server. This includes ASP.NET pages, web services, and user controls. (ASP.NET is the updated version of Microsoft's ASP technology.) Additionally, a cache dictionary is available for developers to store frequently used resources, such as hash tables and other data structures.

A configuration namespace 310 ("System.Web.Configuration") containing classes that are used to read configuration data in for an application.

A UI namespace 312 ("System.Web.UI") containing types that allow developers to create controls and pages that will appear in Web applications as user interfaces on a Web page. This namespace includes the control class, which provides all web based controls, whether those encapsulating HTML elements, higher level Web controls, or even custom User controls, with a common set of functionality. Also provided are classes which provide the web forms server controls data binding functionality, the ability to save the view state of a given control or page, as well as parsing functionality for both programmable and literal controls. Within the UI namespace 312 are two additional namespaces: an HTML controls namespace 314 ("System.Web.UI.HtmlControls") containing classes that permit developers to interact with types that encapsulates html 3.2 elements create HTML controls, and a Web controls namespace 316 ("System.Web.UI.WeblControls") containing classes that allow developers to create higher level Web controls.

A security namespace 318 ("System.Web.Security") containing classes used to implement security in web server applications, such as basic authentication, challenge response authentication, and role based authentication.

A session state namespace 320 ("System.Web.SessionState") containing classes used to access session state values (i.e., data that lives across requests for the lifetime of the session) as well as session-level settings and lifetime management methods.

The client applications namespace 202 is composed of two namespaces:

A windows forms namespace 322 ("System.Windows.Forms") containing classes for creating Windows®-based client applications that take full advantage of the rich user interface features available in the Microsoft Windows® operating system, such as the ability to drag and drop screen elements. Such classes may include wrapped APIs available in the Microsoft Windows® operating system that are used in a windowing UI environment. Within this namespace are a design namespace 324 ("System.Windows.Forms.Design") that contains classes to extend design-time support for Windows forms and a component model namespace 326 ("System.Windows.Forms.ComponentModel") that contains the windows form implementation of the general component model defined in System.ComponentModel. This namespace contains designer tools, such as Visual Studio, which offer a rich experience for developers at design time.

A drawing namespace 328 ("System.Drawing") containing classes for graphics functionality. The drawing namespace 328 includes a 2D drawing namespace 330 ("System.Drawing.Drawing2D") that contains classes and enumerations to provide advanced 2-dimensional and vector graphics functionality, an imaging namespace 332 ("System.Drawing.Imaging") that contains classes for advanced imaging functionality, a printing namespace 334 ("System.Drawing.Printing") that contains classes to permit developers to customize printing, and a text namespace 336 ("System.Drawing.Text") that contains classes for advanced typography functionality.

The data and XML namespace 204 is composed of two namespaces:

A data namespace 340 ("System.Data") containing classes that enable developers to build components that efficiently manage data from multiple data sources. It implements an architecture that, in a disconnected scenario (such as the Internet), provides tools to request, update, and reconcile data in multiple tier systems. The data namespace 340 includes a common namespace 342 that contains types shared by data providers. A data provider describes a collection of types used to access a data source, such as a database, in the managed space. The data namespace 340 also includes an OLE DB namespace 344 that contains types pertaining to data used in object-oriented databases (e.g., Microsoft's SQL Server), and a SQL client namespace 346 that contains types pertaining to data used by SQL clients. The data namespace also includes a SQL types namespace 348 ("System.Data.SqlTypes") that contains classes for native data types within Microsoft's SQL Server. The classes provide a safer, faster alternative to other data types. Using the objects within this namespace helps prevent type conversion errors caused in situations where loss of precision could occur. Because other data types are converted to and from SQL types behind the scenes, explicitly creating and using objects within this namespace results in faster code as well.

An XML namespace 350 ("System.XML") containing classes that provide standards-based support for processing XML. The supported standards include XML (e.g., version 1.0), XML Namespaces (both stream level and DOM), XML Schemas, XPath expressions, XSL/T transformations, DOM Level 2 Core, and SOAP (e.g., version 1.1). The XML namespace 350 includes an XSLT namespace 352 ("System.XML.Xsl") that contains classes and enumerations to support XSLT (Extensible Stylesheet Language Transformations), an Xpath namespace 354 ("System.XML.Xpath") that contains an XPath parser and evaluation engine, and a serialization namespace 356 ("System.XML.Serialization") that contains classes used to serialize objects into XML format documents or streams.

The base class library namespace 206 ("System") includes the following namespaces:

A collections namespace 360 ("System.Collections") containing interfaces and classes that define various collections of objects, such as lists, queues, arrays, hash tables and dictionaries.

A configuration namespace 362 ("System.Configuration") containing classes and interfaces that allow developers to programmatically access configuration settings and handle errors in configuration files.

A diagnostics namespace 364 ("System.Diagnostics") containing classes that are used to debug applications and to trace code execution. The namespace allows developers to start system processes, read and write to event logs, and monitor system performance using performance counters.

A globalization namespace 366 ("System.Globalization") containing classes that define culture-related information, including the language, the country/region, the calendars in use, the format patterns for dates, currency and numbers, and the sort order for strings.

An I/O namespace 368 ("System.IO") containing the infrastructure pieces to operate with the input/output of data streams, files, and directories. This namespace includes a model for working with streams of bytes, higher level readers and writers which consume those bytes, various constructions or implementations of the streams (e.g., FileStream and MemoryStream) and, a set of utility classes for working with files and directories.

A net namespace 370 ("System.Net") providing an extensive set of classes for building network-enabled application, referred to as the Net Class Libraries (NCL). One element to the design of the Net Class Libraries is an extensible, layered approach to exposing networking functionality. The NCL stack contains three basic layers.

A base layer (System.Net.Socket) provides access to an interface to TCP/IP, the communications protocol of UNIX networks and the Internet. One example of such an interface is the "WinSock API" from Microsoft Corporation. The next layer is the Transport Protocol classes, which support such transport protocols as TCP and UDP. Developers may write their own protocol classes to provide support for protocols such as IGMP and ICMP. The third layer is the Web request, which provides an abstract factory pattern for the creation of other protocol classes. The NCL provides implementations for Hyper Text Transport Protocol (HTTP).

A reflection namespace ("System.Reflection") 372 containing types that provide a managed view of loaded types, methods, and fields, with the ability to dynamically create and invoke types.

A resources namespace 374 ("System.Resources") containing classes and interfaces that allow developers to create, store and manage various culture-specific resources used in an application.

A security namespace 376 ("System.Security") supporting the underlying structure of the security system, including interfaces, attributes, exceptions, and base classes for permissions.

A service process namespace 378 ("System.ServiceProcess") containing classes that allow developers to install and run services. Services are long-running executables that run without a user interface. They can be installed to run under a system account that enables them to be started at computer reboot. Services whose implementation is derived from processing in one class can define specific behavior for start, stop, pause, and continue commands, as well as behavior to take when the system shuts down.

A text namespace 380 ("System.Text") containing classes representing various types of encodings (e.g., ASCII, Unicode, UTF-7, and UTF-8), abstract base classes for converting blocks of characters to and from blocks of bytes, and a helper class that manipulates and formats string objects without creating intermediate instances.

A threading namespace 382 ("System.Threading") containing classes and interfaces that enable multi-threaded programming. The threading namespace includes a ThreadPool class that manages groups of threads, a Timer class that enables a delegate to be called after a specified amount of time, and a Mutex class for synchronizing mutually-exclusive threads. This namespace also provides classes for thread scheduling, wait notification, and deadlock resolution.

A runtime namespace 384 ("System.Runtime") containing multiple namespaces concerning runtime features, including an interoperation services namespace 386 ("System.Runtime.InteropServices") that contains a collection of classes useful for accessing COM objects. The types in the InteropServices namespace fall into the following areas of functionality: attributes, exceptions, managed definitions of COM types, wrappers, type converters, and the Marshal class. The runtime namespace 384 further includes a remoting namespace 388 ("System.Runtime.Remoting") that contains classes and interfaces allowing developers to create and configure distributed applications. Another namespace within the runtime namespace 384 is a serialization namespace 390 ("System.Runtime.Serialization") that contains classes used for serializing and deserializing objects. Serialization is the process of converting an object or a graph of objects into a linear sequence of bytes for either storage or transmission to another location.

Exemplary Computing System and Environment

Figure 4:
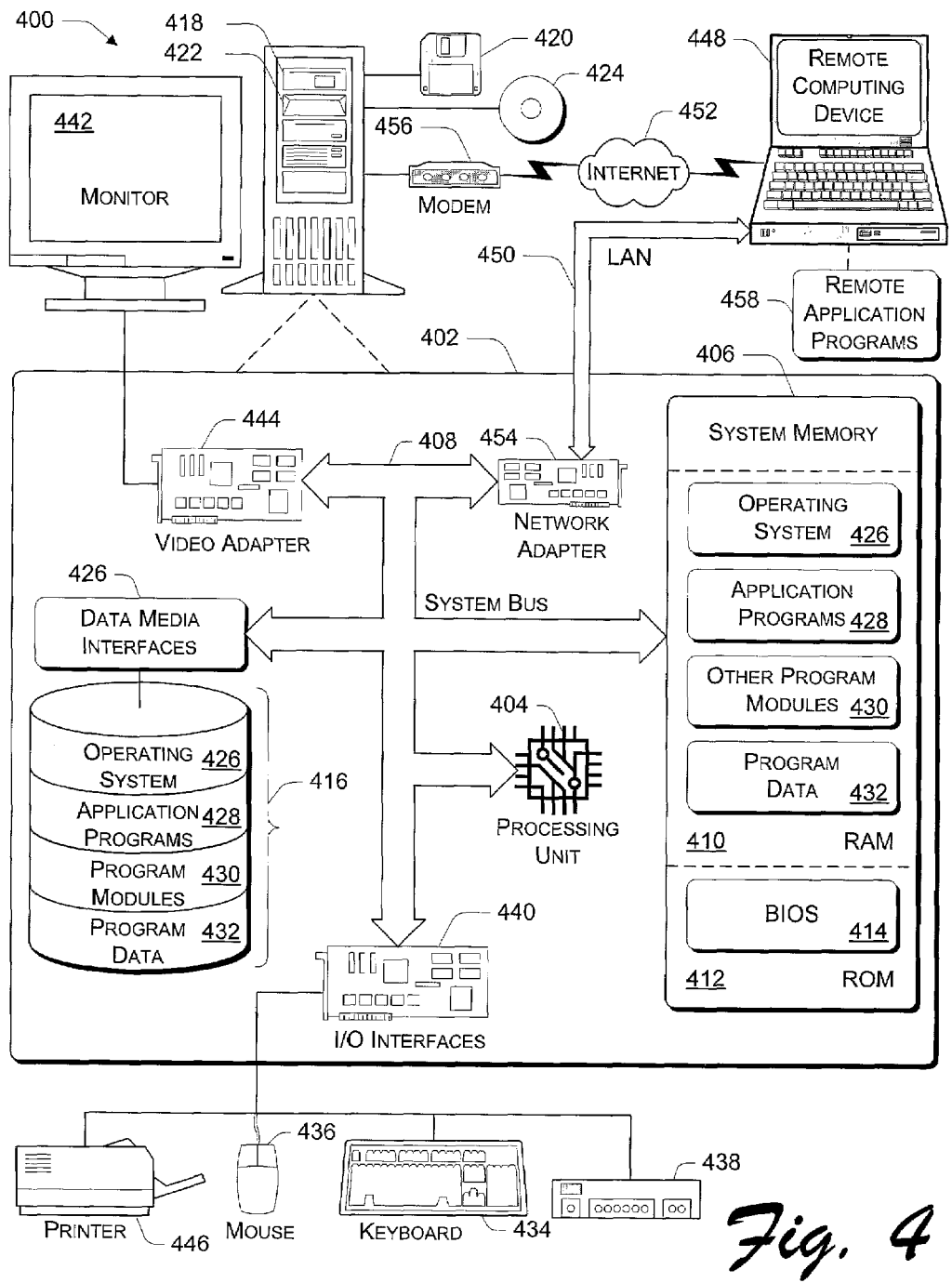
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a go removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A software architecture implemented at least in part by a computing device for a distributed computing system comprising:
    a plurality of applications configured to handle requests submitted by remote devices over a network, the plurality of applications being written in different programming languages;
    an application program interface to present functions used by the plurality of applications to access network and computing resources of the distributed computing system, wherein the application program interface comprises:
    a first group of services related to creating Web applications, the first group of services comprising:
    constructing Web services;
    temporary caching resources;
    performing an initial configuration;
    creating controls and Web pages;
    enabling security in Web server applications; and
    accessing session state values;
    a second group of services related to constructing client applications, the second group of services comprising:
    creating windowing graphical user interface environments; and
    enabling graphical functionality;
    a third group of services related to data and handling XML documents, the third group of services comprising:
    enabling management of data from multiple data sources; and
    functions that enable XML processing; and
    a fourth group of services related to base class libraries, the fourth group of services comprising:
    defining various collections of objects;
    accessing configuration settings and handling errors in configuration files;
    debugging and tracing code execution;
    customizing data according to cultural related information;
    inputting and outputting of data;
    enabling a programming interface to network protocols;
    viewing loaded types, methods, and fields;
    creating, storing and managing various culture-specific resources;
    enabling system security and permissions;
    installing and running services;
    enabling character encoding;
    enabling multi-threaded programming; and
    facilitating runtime operations; and
    a common language runtime layer that translates the plurality of applications written in different programming languages into an intermediate language, the intermediate language being:
    executed natively by the common language runtime layer; and
    configured to access the network and computing resources or the first, second, third, and fourth group of services requested by the remote devices, whereby a seamless integration between multi-language application development, with cross language inheritance is allowed and a robust and secure execution environment for multiple programming languages is provided.

2. The software architecture as recited in claim 1, wherein the distributed computing system comprises client devices and server devices that handle requests from the client devices, the remote devices comprising at least one client device.

3. The software architecture as recited in claim 1, wherein the distributed computing system comprises client devices and server devices that handle requests from the client devices, the remote devices comprising at least one server device that is configured as a Web server.

4. An application program interface embodied on one or more computer readable storage media, comprising:
   a first group of services related to creating Web applications, the first group of services comprising:
   constructing Web services;
   temporary caching resources;
   performing an initial configuration;
   creating controls and Web pages;
   enabling security in Web server applications; and
   accessing session state values;
   a second group of services related to constructing client applications, the second group of services comprising:
   creating windowing graphical user interface environments; and
   enabling graphical functionality;
   a third group of services related to data and handling XML documents, the third group of services comprising:
   enabling management of data from multiple data sources; and
   functions that enable XML processing; and
   a fourth group of services related to base class libraries, the fourth group of services comprising:
   defining various collections of objects;
   accessing configuration settings and handling errors in configuration files;
   debugging and tracing code execution;
   customizing data according to cultural related information;
   inputting and outputting of data;
   enabling a programming interface to network protocols;
   viewing loaded types, methods, and fields;
   creating, storing and managing various culture-specific resources;
   enabling system security and permissions;
   installing and running services;
   enabling character encoding;
   enabling multi-threaded programming; and
   facilitating runtime operations; and
   a common language runtime layer that translates Web applications written in different programming languages into an intermediate language, the intermediate language being:
   executed natively by the common language runtime layer; and
   configured to access resources or the first, second, third, and fourth group of services, whereby a seamless integration between multi-language application development, with cross language inheritance is allowed and a robust and secure execution environment for multiple programming languages is provided, wherein the seamless integration allows for the ability to use a particular code module written in a first programming language with a code module written in a second programming language.

5. A network software architecture comprising the application program interface as recited in claim 4.

6. A distributed computer software architecture implemented at least in part by a computing device, comprising:
   one or more applications written in different programming languages and configured to be executed on one or more computing devices, the one or more applications written in different programming languages handling requests submitted from remote computing devices;
   a networking platform to support the one or more applications;
   an application programming interface to interface the one or more applications with the networking platform, wherein the application program interface comprises:
   a first group of services related to creating Web applications, the first group of services comprising:
   constructing Web services;
   temporary caching resources;
   performing an initial configuration;
   creating controls and Web pages;
   enabling security in Web server applications; and
   accessing session state values;
   a second group of services related to constructing client applications, the second group of services comprising:
   creating windowing graphical user interface environments; and
   enabling graphical functionality;
   a third group of services related to data and handling XML documents, the third group of services comprising:
   enabling management of data from multiple data sources; and
   functions that enable XML processing; and
   a fourth group of services related to base class libraries, the fourth group of services comprising:
   defining various collections of objects;
   accessing configuration settings and handling errors in configuration files;
   debugging and tracing code execution;
   customizing data according to cultural related information;
   inputting and outputting of data;
   enabling a programming interface to network protocols;
   viewing loaded types, methods, and fields;
   creating, storing and managing various culture-specific resources;
   enabling system security and permissions;
   installing and running services;
   enabling character encoding;
   enabling multi-threaded programming; and
   facilitating runtime operations; and
   a common language runtime layer that translates the one or more applications written in different programming languages into an intermediate language being executed natively by the common runtime layer and configured to access resources or the first, second, third, and fourth group of services requested by the remote devices, whereby a seamless integration, with cross-language inheritance, between the one or more applications developed with multiple programming languages and the computing device is provided.

7. The distributed computer software architecture as recited in claim 6, further comprising a remote application configured to be executed on one of the remote computing devices, the remote application using the application programming interface to access the networking platform.

8. A computer system comprising:
one or more microprocessors; and
one or more software programs that are written in different programming languages and utilize an application program interface to request services from an operating system through a common language runtime layer, the application program interface comprising:
separate commands to request services consisting of the following groups of services:
A. a first group of services related to creating Web applications, the first group of services comprising:
constructing Web services;
temporary caching resources;
performing an initial configuration;
creating controls and Web pages;
enabling security in Web server applications; and
accessing session state values;
B. a second group of services related to constructing client applications, the second group of services comprising:
creating windowing graphical user interface environments; and
enabling graphical functionality;
C. a third group of services related to data and handling XML documents, the third group of services comprising:
enabling management of data from multiple data sources; and
functions that enable XML processing;
D. a fourth group of services related to base class libraries, the fourth group of services comprising:
defining various collections of objects;
accessing configuration settings and handling errors in configuration files;
debugging and tracing code execution;
customizing data according to cultural related information;
inputting and outputting of data;
enabling a programming interface to network protocols;
viewing loaded types, methods, and fields;
creating, storing and managing various culture-specific resources;
enabling system security and permissions;
installing and running services;
enabling character encoding;
enabling multi-threaded programming; and
facilitating runtime operations; and
a common language runtime layer that allows seamless multi-language development, with cross language inheritance and translates the one or more software programs written in different programming languages into an intermediate language, wherein the intermediate language is executed natively by the common language runtime layer and is configured to access the first, second, third, and fourth group of services requested by the one or more software programs.

9. A method implemented at least in part by a computer, the method comprising:
creating a first namespace with functions that enable browser/server communication, the first namespace defining classes that facilitate:
construction and use of Web services;
temporary caching of resources;
an initial configuration;
creation of controls and Web pages;
security in Web server applications; and
access to session state values;
creating a second namespace with functions that enable drawing and construction of client applications, the second namespace defining classes that facilitate:
creation of windowing graphical user interface environments; and
graphical functionality;
creating a third namespace with functions that enable connectivity to data sources and XML functionality, the third namespace defining classes that facilitate:
management of data from multiple data sources; and
processing of XML documents;
creating a fourth namespace with functions that enable system and runtime functionality, the fourth namespace defining classes that facilitate:
programmatic access to configuration settings and handling of errors in configuration files;
application debugging and code execution tracing;
customization of data according to cultural related information;
inputting and outputting of data;
interfacing to network protocols;
viewing loaded types, methods, and fields;
creation, storage and management of various culture-specific resources;
system security and permissions;
installation and running of services;
character encoding;
multi-threaded programming; and
runtime operations; and
providing a common language runtime layer that translates Web applications written in different programming languages into an intermediate language, the intermediate language being:
executed natively by the common language runtime layer; and
configured to access resources or services requested by the client applications, whereby a seamless integration between multi-language application development, with cross-language inheritance is allowed and a robust and secure execution environment for multiple programming languages is provided.

10. A method implemented at least in part by a computer, the method comprising:
calling one or more first functions to facilitate browser/server communication, the first functions comprising functions for construction and use of Web services, temporary caching of resources, an initial configuration, creation of controls and pages that will appear as user interfaces, securing Web server applications and accessing session state values;
calling one or more second functions to facilitate construction of client applications, the second functions comprising functions for creating window graphical user interface environments and graphical functionality;
calling one or more third functions to facilitate connectivity to data sources and XML functionality, the third functions comprising functions for management of data from multiple data sources and XML processing;
calling one or more fourth functions to access system and runtime resources, the fourth functions comprising functions for programmatic access to configuration settings, application debugging and code execution tracing, customization of text according to cultural related information, synchronous and asynchronous reading from and writing to data streams and files, creation and management of various culture-specific resources, system security and permissions, installation and running of services, character encoding, and multi-threaded programming; and using a common language runtime layer that translates Web applications written in different programming languages into an intermediate language that is:

executed natively by the common language runtime layer; and configured to access resources or services requested by the client applications, whereby a seamless integration between multi-language application development, with cross-language inheritance is allowed and a robust and secure execution environment for multiple programming languages is provided, wherein the seamless integration allows for the ability to use a particular code module written in a first programming language with a code module written in a second programming language.

11. A method implemented at least in part by a computer, the method comprising:

receiving one or more calls to one or more first functions to facilitate browser/server communication, the one or more first functions comprising functions for construction and use of Web services, temporary caching of resources, initial configuration, creation of controls and pages that will appear as user interfaces, securing Web server applications and accessing session state values;

receiving one or more calls to one or more second functions to facilitate construction of client applications, the one or more second functions comprising functions for creating windowing graphical user interface environments and graphical functionality;

receiving one or more calls to one or more third functions to facilitate connectivity to data sources and XML functionality, the one or more third functions comprising functions for management of data from multiple data sources and XML processing;

receiving one or more calls to one or more fourth functions to access system and runtime resources, the one or more fourth functions comprising functions for programmatic access to configuration settings, application debugging and code execution tracing, customization of text according to cultural related information, synchronous and asynchronous reading from and writing to data streams and files, creation and management of various culture-specific resources, system security and permissions, installation and running of services, character encoding, and multi-threaded programming; and using a common language runtime layer that allows seamless multi-language development, with cross language inheritance and translates Web applications written in different programming languages into an intermediate language that is supported by the common language runtime layer and configured to access services requested by the client applications, whereby a seamless integration provides a robust and secure execution environment for multiple programming languages.

12. A method implemented at least in part by a computer, for exposing resources using an application program interface, the method comprising:

exposing a first group of services related to creating Web applications, the first group of services comprising:
constructing Web services;
temporary caching resources;
performing an initial configuration;
creating controls and Web pages;
enabling security in Web server applications; and
accessing session state values;

exposing a second group of services related to constructing client applications, the second group of services comprising:
creating windowing graphical user interface environments; and
enabling graphical functionality;

exposing a third group of services related to data and handling XML documents, the third group comprising:
enabling management of data from multiple data sources; and
functions that enable XML processing;

exposing a fourth group of services related to base class libraries, the fourth group of services comprising:
defining various collections of objects;
accessing configuration settings and handling errors in configuration files;
debugging and tracing code execution;
customizing data according to cultural related information;
inputting and outputting of data;
enabling a programming interface to network protocols;
viewing loaded types, methods, and fields;
creating, storing and managing various culture-specific resources;
enabling system security and permissions;
installing and running services;
enabling character encoding;
enabling multi-threaded programming; and
facilitating runtime operations; and providing a common language runtime layer, with cross-language inheritance that translates Web applications written in different programming languages into an intermediate language,
the intermediate language being:
executed natively by the common language runtime layer; and
configured to access resources requested by the client applications;

wherein, the different program languages are selected from a plurality of programming languages, the plurality of programming languages comprising:
Visual Basic;
C++;
C#;
COBOL;
Jscript;
Perl;
Eiffel; and
Python.

* * * * *